(12) United States Patent
Doskocz

(10) Patent No.: US 8,487,214 B2
(45) Date of Patent: Jul. 16, 2013

(54) MOBILE SELF-ALIGNING UNIVERSAL WELDING CARRIAGE

(75) Inventor: John Doskocz, Calgary (CA)

(73) Assignee: Omega Manufacturing Corp., Calgary, Alberta (CA)

( * ) Notice: Subject to any disclaimer, the term of this patent is extended or adjusted under 35 U.S.C. 154(b) by 194 days.

(21) Appl. No.: 13/008,838

(22) Filed: Jan. 18, 2011

(65) Prior Publication Data

US 2011/0174794 A1   Jul. 21, 2011

Related U.S. Application Data

(60) Provisional application No. 61/295,944, filed on Jan. 18, 2010.

(51) Int. Cl.
*B23K 9/12* (2006.01)

(52) U.S. Cl.
USPC .................. 219/124.31; 219/136; 280/42

(58) Field of Classification Search
USPC ............... 219/136; 74/469; 280/42; 173/187
See application file for complete search history.

(56) References Cited

U.S. PATENT DOCUMENTS

| | | | | |
|---|---|---|---|---|
| 520,919 | A * | 6/1894 | Garver | 280/653 |
| 3,870,853 | A * | 3/1975 | Reinhardt et al. | 219/124.31 |
| 3,937,918 | A | 2/1976 | Robertson | |
| 4,432,638 | A * | 2/1984 | Tarsia | 355/63 |
| 5,123,665 | A * | 6/1992 | Levy | 280/35 |
| 5,743,541 | A * | 4/1998 | Cook | 280/43.13 |
| 5,782,483 | A * | 7/1998 | Rogers et al. | 280/642 |
| 6,186,252 | B1 * | 2/2001 | Schaffner et al. | 180/65.1 |
| 6,467,788 | B1 * | 10/2002 | Li et al. | 280/304.1 |
| 7,097,182 | B1 * | 8/2006 | Liu | 280/42 |
| 7,118,115 | B2 * | 10/2006 | Abel | 280/43.13 |
| 7,299,906 | B2 * | 11/2007 | McAndrews | 188/275 |
| 7,339,134 | B2 * | 3/2008 | Stropki et al. | 219/130.1 |
| 7,604,244 | B2 | 10/2009 | Klein et al. | |
| 2002/0093156 | A1 * | 7/2002 | Stevens et al. | 280/42 |
| 2002/0113414 | A1 * | 8/2002 | Tomasi et al. | 280/650 |
| 2006/0101781 | A1 * | 5/2006 | Watts | 52/749.1 |
| 2007/0084980 | A1 * | 4/2007 | McNeill | 248/188.2 |
| 2007/0089648 | A1 * | 4/2007 | Harrison et al. | 108/115 |
| 2008/0314281 | A1 * | 12/2008 | Carroll | 104/130.07 |

OTHER PUBLICATIONS

PCT International Search Report (mailed Mar. 29, 2011).
Miller Tractors (Specification and Order Sheet—Mar. 2008).
SAF Catalogue for Weldycar Minisaf Megasaf.

* cited by examiner

*Primary Examiner* — Joseph M Pelham
*Assistant Examiner* — Lawrence Samuels
(74) *Attorney, Agent, or Firm* — Sean W Goddwin

(57) ABSTRACT

A welding carriage has a frame that is adjustable in width and height and is guided by the sides of a workpiece. First and second wheel assemblies support the frame upon the workpiece, the first and second wheel assemblies forcibly engaging the sides of the workpiece for guiding the frame along a path substantially parallel thereto. The frame comprises two opposing lateral sides interconnected by a linkage therebetween. The linkage can be actuated to adjust a coarse width of the frame, dimensional variations being handles by biased guide wheels of the second wheel assembly. Each of the opposing lateral sides further has vertically adjustable leg posts for adjusting a vertical height of the frame.

22 Claims, 17 Drawing Sheets

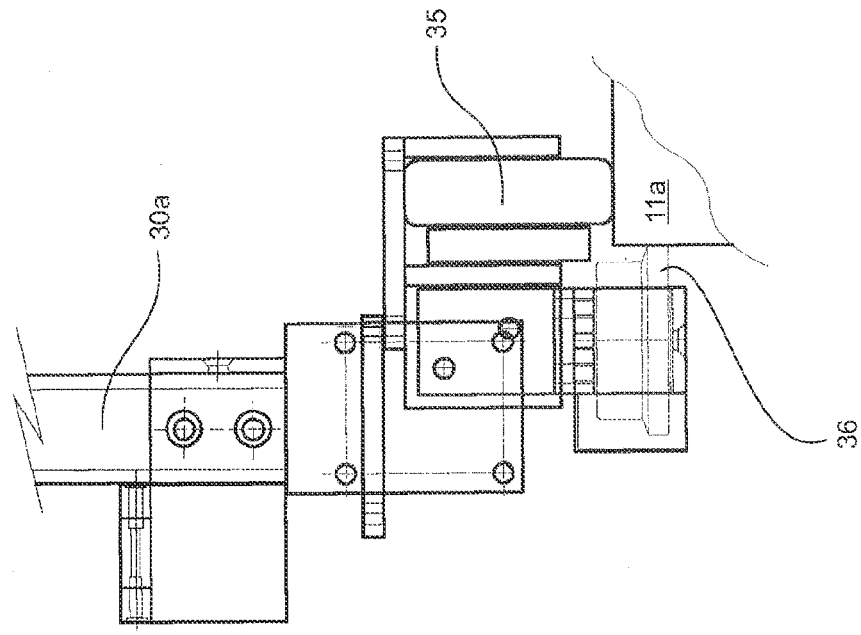
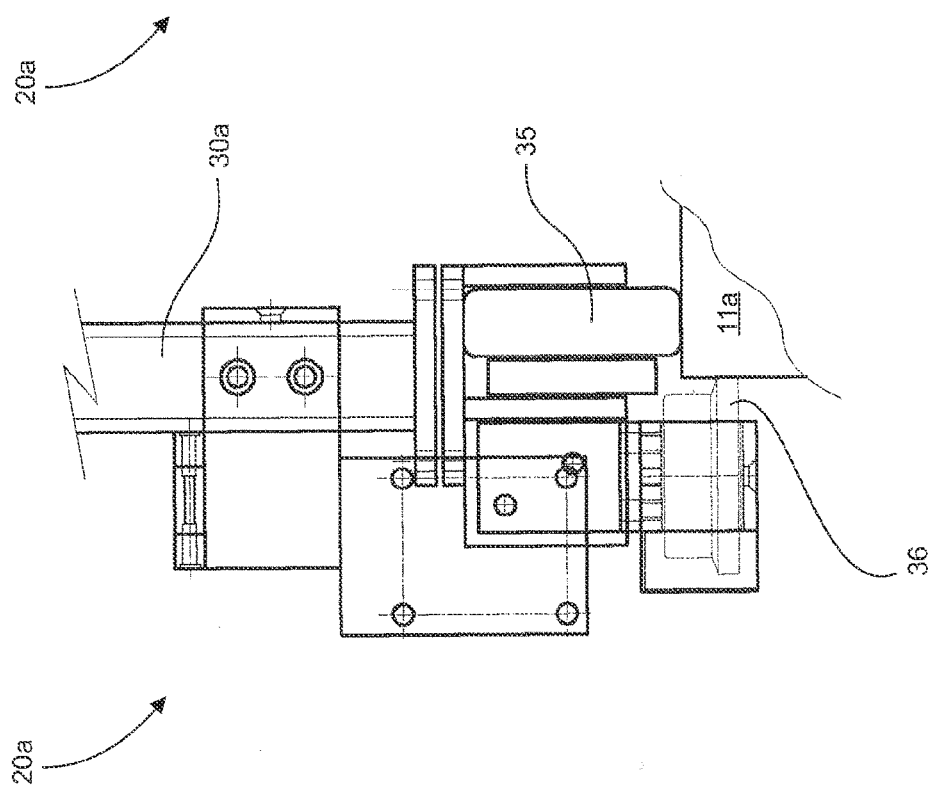
Fig. 5A
Fig. 5B

MOBILE SELF-ALIGNING UNIVERSAL WELDING CARRIAGE

CROSS REFERENCE TO RELATED APPLICATIONS

This application claims the benefits under 35 U.S.C. 119(e) of the U.S. Provisional Application Ser. No. 61/295,944, filed Jan. 18, 2010, which is incorporated fully herein by reference.

FIELD OF THE INVENTION

This invention relates to welding carriages for supporting welding machines. More particularly, this invention relates to a self propelled welding carriage having first and second wheel assemblies for securing the welding carriage to a workpiece and for cooperatively guiding and aligning the welding carriage along a path relative to a joint to be welded on the workpiece.

BACKGROUND OF THE INVENTION

Welding is a fabrication process that joins materials, usually metals or thermoplastics, by causing coalescence of the materials. This is often accomplished by melting the base material of a workpiece and a filler material together to form a molten pool (weld pool) that cools to become a strong joint, typically stronger than the base material. Welding differs from soldering and brazing, which involve melting a lower-melting point material between base materials to form a bond therebetween.

A common method of welding is arc welding. Arc welding uses a power supply to create an electric arc between an electrode (the filler material) and the workpieces, melting base and filler material at a welding point, weld joint or seam. The welding area is often protected from oxidation by some type of inert material, such as a gas, or a filler material.

In shielded metal arc welding, also known as manual metal arc welding or stick welding, an electric current is used to strike an arc between the workpiece and a consumable electrode rod. The electrode rod is made of steel and covered with a flux. The flux protects the weld area from oxidation and contamination by producing carbon dioxide gas during the welding process. The electrode rod core acts as a filler material, thus obviating the need for a separate filler material.

In submerged arc welding, commonly referred to as SAW, a continuously fed consumable electrode serves to create an electrical arc with the workpiece. The molten weld and the arc zone are protected from atmospheric contamination by being submerged under a fusible flux. When molten, the flux becomes conductive and produces a current path between the electrode and the workpiece. The layer of flux completely covers the molten metal thus preventing spatter and sparks as well as suppressing ultraviolet radiation and fumes associated with the welding process.

Submerged arc welding can be mechanized and automated. Mechanized and automated submerged arc welding processes are usually limited to flat horizontal welding positions. Automated submerged arc welding machines are generally supported on a self-propelled, welding carriage that is capable of guiding itself.

Self-guiding welding carriages currently being used are either guided along permanently placed tracks or rails, or guided by a crabbing arm aligned relative to a vertical flange or rail. Welding carriages that are guided along a permanently placed track is limited in portability of the welding carriage and is also limited to smaller fabrication projects. Projects involving welding large dimensioned objects typically require a larger dimensional welding carriage and often can include the use of a gantry or crane.

Another disadvantage of a welding carriage guided along a permanently placed track is the placement of the object to be welded. As the tracks are permanently placed, the workpiece must be precisely placed parallel to the track, for aligning the welding machine relative to the weld seam. A slight misalignment of the welding machine can result in a misplaced weld seam. Quite often, workpieces are of substantial weight thus requiring the aid of a crane. Precisely placing a heavy workpiece with a crane parallel to the track, to align the welding machine with the weld seam, is difficult and can take large amounts of time.

Self-guiding welding carriages also have the disadvantage of not being able to be self-aligning. The welding carriages are guided along a rigid track or rail. The self-guiding welding machines travel along a substantially straight line, and does not deviate from the track or rail. However, during the welding process, the workpiece and thus its base material, such as metal, is subjected to localized extreme heat. The localized heating of the base material can cause it to expand differentially and result in the warping or distortion of the base material. Even after the welding machine is precisely aligned parallel to the track or rail of the welding carriage, the warping caused by the heat usually causes the weld seam to shift. This necessitates stoppage of the welding process to re-align the welding machine, significantly increasing the time to complete a welding project.

Further, permanently placed tracks or rails usually require a large amount of real estate that is specifically designated for welding. Such equipment, including larger gantries, are not readily mobile. Welding machines and carriages must be brought to the tracks or rails and thus welding projects must be performed at specific locations only.

SUMMARY OF THE INVENTION

A self-propelled, adjustable welding carriage is disclosed. The carriage is adapted to support at least one welding machine relative to a weld joint or seam to be welded on a workpiece having substantially linear first and second lateral sides. The at least one welding machine can include a spool or reel for a continuously feeding electrode. The carriage has one first and second wheel assemblies for laterally gripping the first and second lateral sides of the workpiece for cooperatively guiding and aligning itself relative to the weld joint. The carriage is adapted for movement along the workpiece, using the workpiece for self-aligning the at least one welding machine relative to the weld joint along the entire length of the workpiece.

The carriage can comprise a frame having first and second lateral supports, and a linkage therebetween for interconnecting the first and second lateral supports. In one embodiment, the linkage can comprise leading and trailing linkages which can be adjustable for adjusting a lateral spacing of a working width therebetween. The frame is supported on at least one first and at least one second wheel assemblies, the at least one first wheel assembly movably engaging the first lateral side of the workpiece while the at least one second wheel assembly movably engages the second lateral side. The at least one first and the at least one second wheel assemblies forcibly engage the respective first and second lateral sides for guiding and aligning the welding carriage as the carriage travels upon the workpiece.

The leading and trailing linkages can each comprise two, four-bar parallelogram linkages coupled to one another which actuate in unison for adjusting the lateral spacing or the working width of the carriage.

In a broad aspect of the invention, a welding carriage for supporting at least one welding machine relative to a workpiece having substantially linear first and second lateral sides and a joint to be welded, has a first lateral support having at least one first wheel assembly, a second lateral support having at least one second wheel assembly, and a connector between the first and second lateral supports for forming a frame for supporting the at least one welding machine.

The first and second wheel assemblies support the frame for movement upon the workpiece and for guiding the frame relative to the first and second sides and along a path substantially parallel to the first and second lateral sides.

In another broad aspect of the invention, a method of welding at least one joint along a workpiece comprises movably supporting a welding machine upon the workpiece, propelling the welding machine along the workpiece, and guiding the welding machine along a path along the workpiece by engaging opposing and substantially parallel sides of the workpiece, the sides being substantially parallel to the joint to be welded.

BRIEF DESCRIPTION OF THE FIGURES

FIG. 5A is an end view of the embodiment according to FIG. 3A, illustrating the first wheel assembly having a support wheel and a guide wheel;

FIG. 5B is an end view of the first wheel assembly according to FIG. 5A, the leg post supporting the first wheel assembly in a laterally offset position;

DETAILED DESCRIPTION OF THE INVENTION

A welding carriage comprises a frame adapted to movably support at least one welding machine relative to a workpiece typically having substantially parallel and opposing lateral sides. The welding carriage is supported upon a top surface of the workpiece and uses the substantially parallel and opposing lateral sides of the workpiece to guide and align itself relative to a weld joint to be welded, as the welding carriage travels or is propelled along the length of the workpiece. The frame can be adjustable to adapt to different widths of different workpieces.

Figure 1:
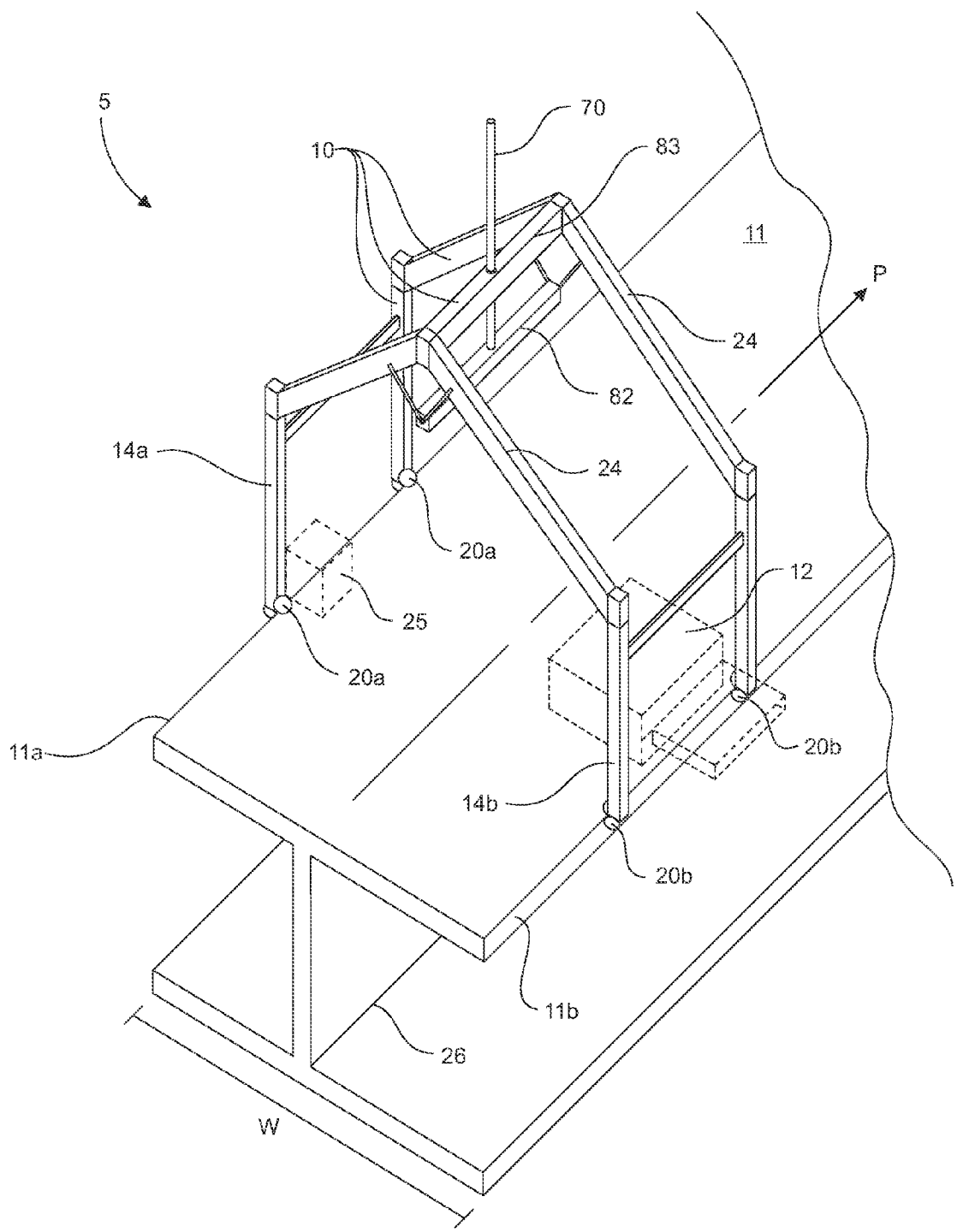
FIG. 1 is a schematic representation of an embodiment of the present invention illustrating a frame having first and second lateral supports supported by at least a first wheel assembly and at least a second wheel assembly respectively, the frame positioned across a flange of an I-beam being fabricated, the first and second lateral supports being adjustable for width by a pair of linkages.
Figure 2:
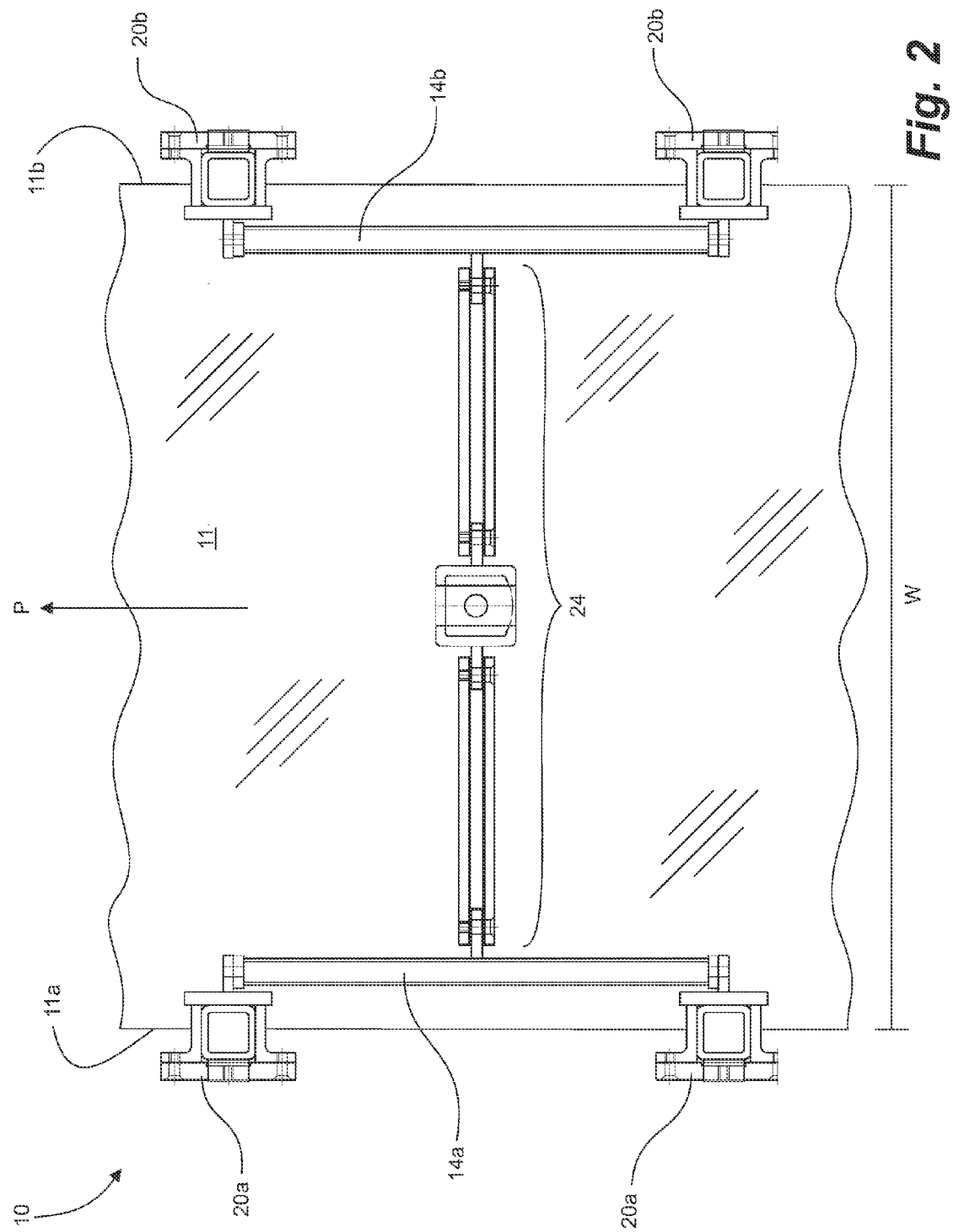
FIG. 2 is a plan view of an embodiment of the present invention illustrating a frame over a workpiece, the frame having first and second lateral supports interconnected by a linkage.

In more detail and with reference to FIGS. 1 and 2, a welding carriage 5 comprises a frame 10 adjustable in width and in height and is moveably supported on a workpiece 11. The frame 10 supports a welding machine 12. The workpiece is characterized by opposing and substantially parallel sides 11a, 11b.

In the embodiment of FIG. 1, the workpiece has a first lateral side 11a which is substantially parallel to a second substantially linear lateral side 11b. A typical workpiece has the form of an I-beam comprising flanges spaced by a web, an upper flange of which forms the substantially linear first and second opposing and substantially parallel sides 11a, 11b. A typical joint to be welded is the interface between the web and the flanges.

The frame 10 is supported upon the workpiece 11 by a first lateral support 14a and a second lateral support 14b interconnected by a connector 24. The connector 24 can be adjustable for adjusting a lateral spacing between the first and second lateral supports 14a, 14b for adapting to different widths W of the workpiece 11 or different workpieces. The first lateral support 14a comprises at least a first wheel assembly 20a fixed relatively to a path P and the second lateral support 14b comprises at least a second wheel assembly 20b. The first and second wheel assemblies 20a, 20b movably and forcibly engage the respective first and second lateral sides 11a, 11b of the workpiece 11 respectively for movably supporting and guiding the welding carriage 5 along the path P. The welding carriage 5 further comprises a drive 25 (not detailed) for propelling the carriage 5 along the path P for welding a weld joint 26 that is substantially parallel to the path P.

The width W of the workpiece 11 determines the lateral spacing between the first and second sides 11a, 11b and the lateral spacing between the first and second lateral supports 14a, 14b. In an embodiment, the width of the workpiece 11 is constant, having linear lateral sides 11a, 11b that are substantially parallel to one another along the entire length of the workpiece 11. In another embodiment, the lateral sides 11a, 11b might have generally undulating or arcuate profile with any discrete section of a first side 11a being substantially parallel to a corresponding and opposing section of the second side 11b.

Figure 3A:
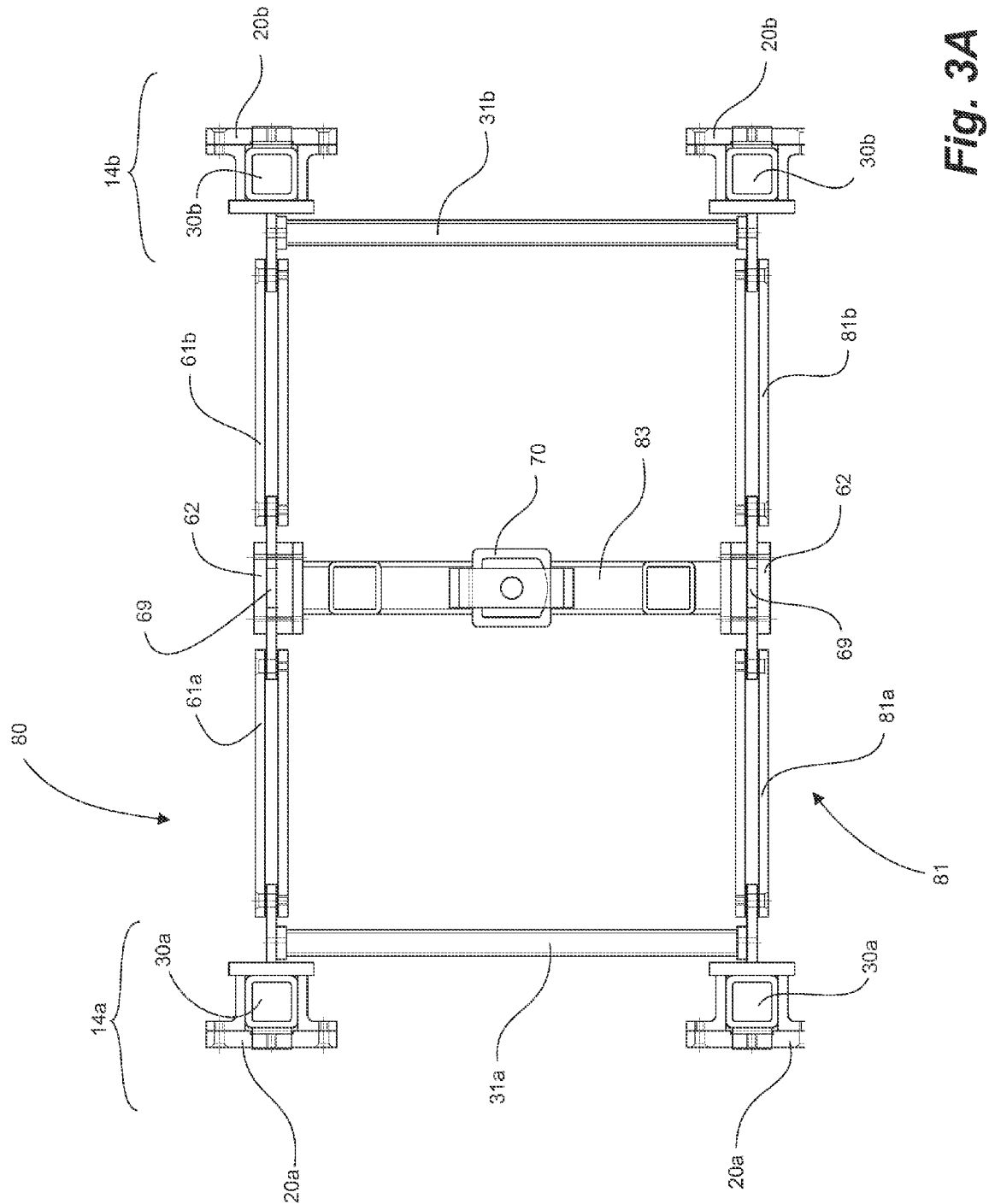
FIG. 3A is a plan view of an embodiment of the present invention illustrating a frame having first and second lateral supports interconnected by a leading and a trailing linkages, the frame further having a common fulcrum yoke connected between the leading and trailing linkages.
Figure 3B:
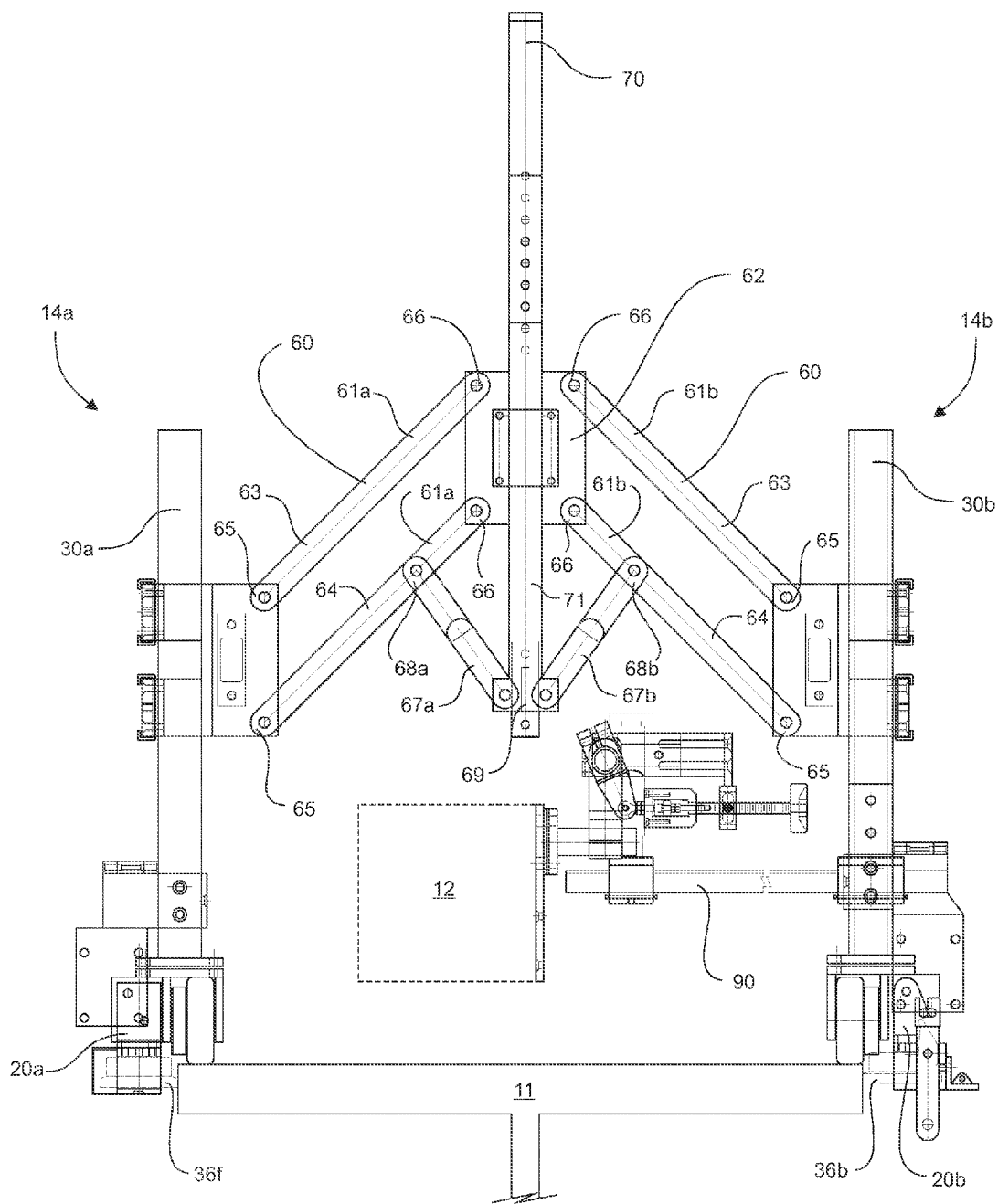
FIG. 3B is an end view of the embodiment according to FIG. 3A illustrating the first and second lateral supports and one of the four-bar parallelogram linkages connected at a common fulcrum point and actuation linkages connected to a common actuator point.

With reference to the embodiment of FIGS. 3A and 3B, the first lateral support 14a can comprise a first pair of leg posts 30a, 30a for supporting the first wheel assembly 20a and a second pair of leg posts 30b, 30b for supporting the second wheel assembly 20b. Each lateral support 14a, 14b can be fit with multiple wheel assemblies 20a, 20b respectively, one wheel assembly for each leg post 30a, 30a, 30b and 30b.

The first pair leg posts 30a, 30a can be rigidly spaced and interconnected by a first stabilizing member 31a. Similarly, the second pair leg posts 30b, 30b can be rigidly spaced and interconnected by a second stabilizing member 31b. The first and second stabilizing members 31a, 31b provide structural rigidity and support to the overall frame 10.

As shown, each leg post 30a, 30a, 30b, 30b can be independently adjustable for adjusting a vertical height of the carriage 5 and further can be interchangeable with one another.

With reference to FIGS. 4, 5A, 5B, 6, 7, and 9A to 9C, each wheel assembly 20a, 20b comprises at least support wheels 35 for engaging the workpiece 11 and movably supporting the carriage 5 thereupon. Further, each wheel assembly 20a, 20b comprises guide wheels 36 oriented for engaging the opposing and substantially parallel lateral sides 11a, 11b of the workpiece 11. The guide wheel 36 of one of the first wheel assembly 20a or the second wheel assembly 20b are fixed guide wheels 36f, being fixed relative to the frame 10, and engaging the respective first or second side 11a, 11b of the workpiece 11. The other of the second or first wheel assembly 20b, 20a comprise biased guide wheels 36b for forcibly and adjustably engaging the other second or first side 11b, 11a respectively.

As shown in the embodiments of FIGS. 3B, 7 and 9A to 9C, the first wheel assembly 20a comprises fixed guide wheels 36f, 36f and the second wheel assembly 20b comprises biased guide wheels 36b, 36b. The combination of the frame 10, the fixed guide wheels 36f, 36f and the biased guide wheels 36b, 36b grip the workpiece 11 between the first and second lateral supports 14a, 14b and accommodate some dimensional variation in the condition of the sides 11a, 11b and the width W of the workpiece 11.

With reference to FIG. 5A, the first wheel assembly 20a is fit to a bottom end of each leg post 30a, each support wheel 35 being arranged under the leg post 30a for support upon the workpiece 11 and the guide wheel 36 being arranged adjacent the workpiece 11 and depending below the fixed wheel 35 for engaging the side 11a. As shown in FIG. 5B, and in an embodiment, the first wheel assembly 20a can be positioned to be laterally offset relative to its leg post 30a.

Figure 7:
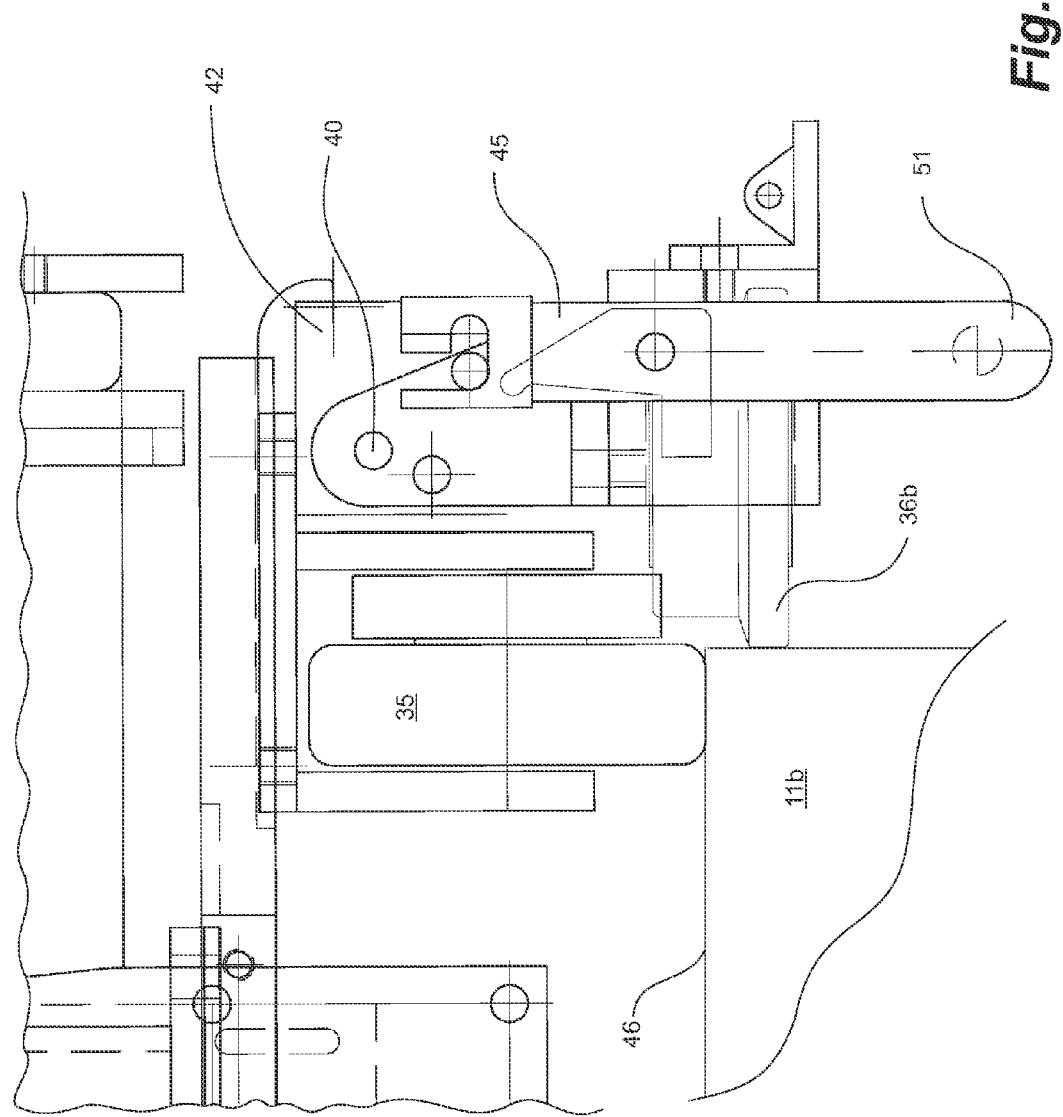
FIG. 7 is a partial end view of the second wheel assembly of FIG. 3A, illustrating a support wheel and a guide wheel having a tensioning device for actuating the second guide wheel between an biased unengaged positions and an engaged position.
Figure 9A:
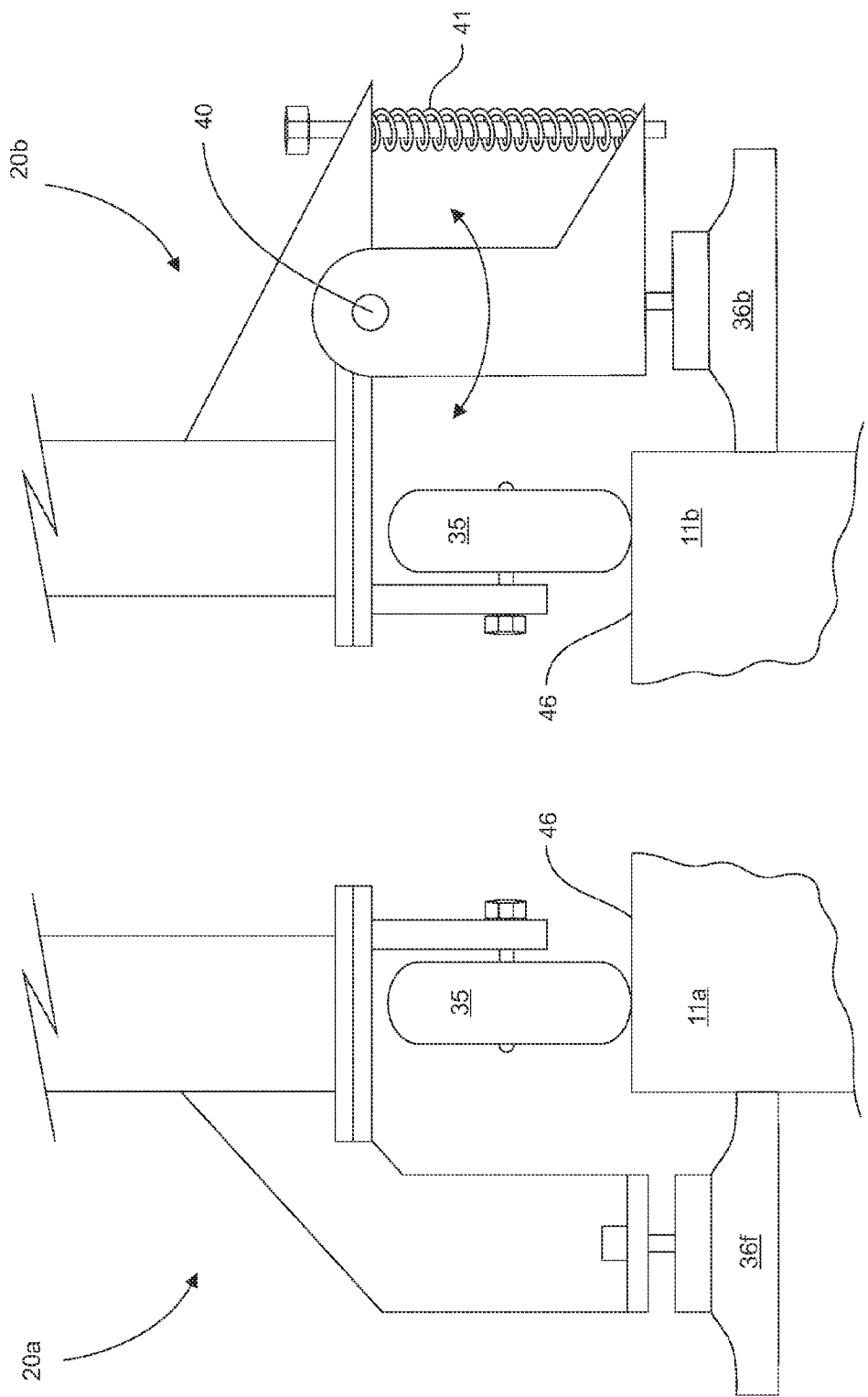
FIG. 9A is a schematic representation of an embodiment of the frame, illustrating a laterally fixed first wheel assembly supported upon a workpiece and movably engaging a first lateral side of the workpiece and a laterally biased second wheel assembly in a biased engaged position, the second wheel assembly being supported on upon the workpiece and pressingly engaging the second lateral side of the workpiece.
Figure 9C:
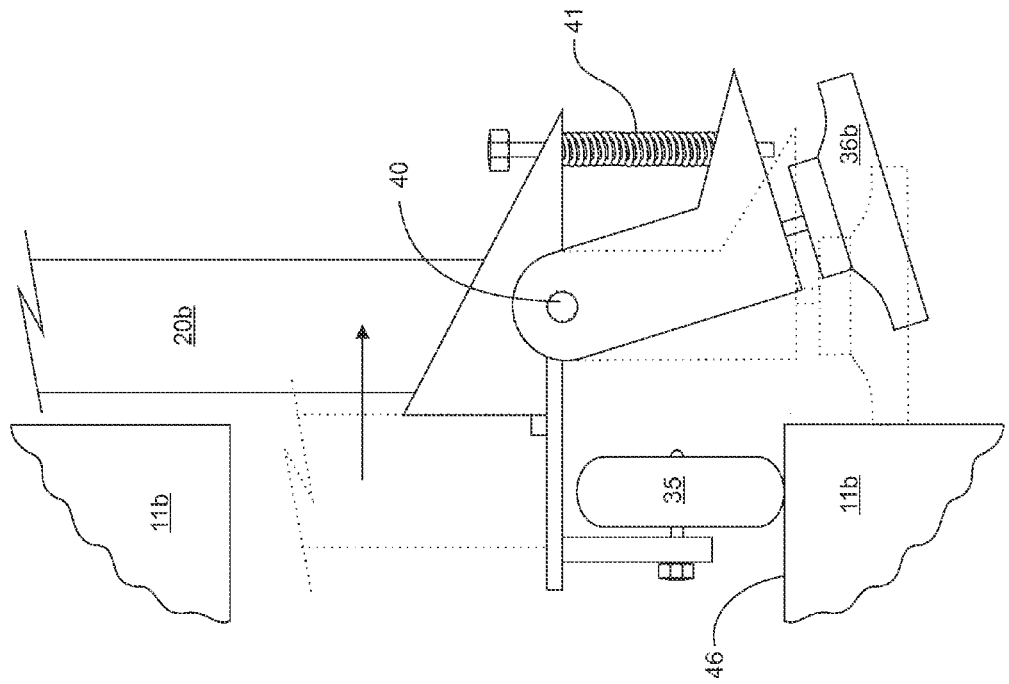
FIG. 9C is a schematic representation of the embodiment according to FIG. 9A, illustrating the second wheel assembly being positioned laterally offset from a leg post of the second lateral support, providing clearance for an upper flange of a workpiece.
Figure 9B:
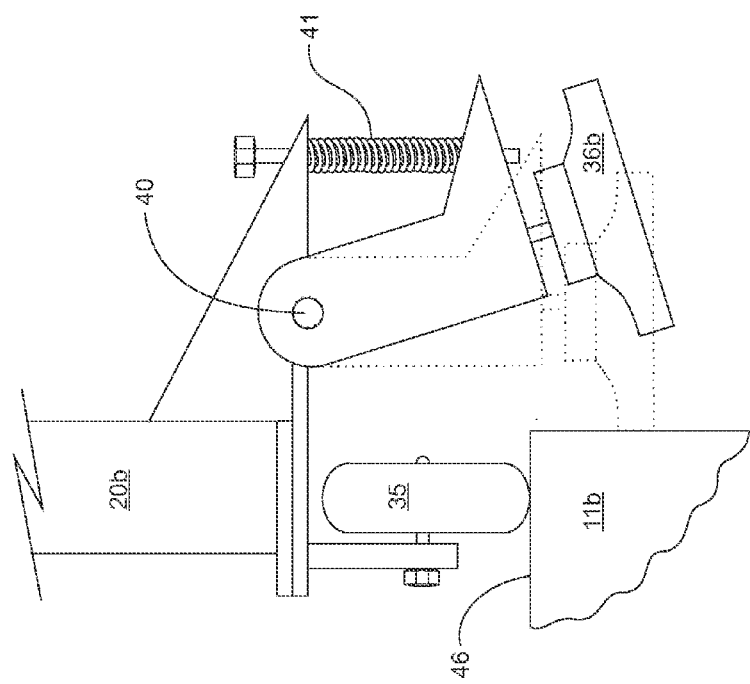
FIG. 9B is a schematic representation of the embodiment according to FIG. 9A, illustrating the second wheel assembly in an unengaged position.

With reference to FIGS. 9A to 9C, the guide wheel 36b of the second wheel assembly 20b is laterally and movably biased for pressing into the second lateral side 11b. The biased guide wheel rotates about pivot 40 from the second lateral support 20b and a spring 41 can provided the biasing force. As shown in FIG. 7, a wheel housing 42 can support the biased guide wheel pivot 40 and incorporated a tensioning device 45 for biasing the biased guide wheel 36b and locking the biased guide wheel 36b in the biased engaged position or in the unengaged position.

The biased guide wheel or wheels 36b are operable between an engaged and an unengaged position. In its unengaged position, the biased guide wheel 36b is positioned and spaced away from the second lateral side 11b. In its engaged position, the biased guide wheel 36b is positioned to grip and pressingly engage the second lateral side 11b, and which through the frame, reactively presses the fixed guide wheel 35 into the first lateral side 11a to cooperatively secure the carriage 5 to the workpiece 11 and aligned with the path P.

The first wheel assembly 20a of the first lateral support 14a is aligned with the first lateral side 11a. The support wheels 35 are positioned to be supported upon a top surface 46 of the workpiece 11. The fixed guide wheels 36a are arranged to movably engage the first side 11a. The biased guide wheels 36b can be manipulated if necessary, such as to the unengaged position, to engage the support wheels of the second lateral support 20b to be supported upon the top surface 46. The biased guide wheels 36b are then permitted to move to the engaged position to engage the second lateral side 11b with the frame 10 straddling the workpiece 11. The fixed and biased guide wheels 36f, 36b, cooperatively act to guide and align the carriage 5 relative to the first or second lateral sides 11a, 11b as the carriage 5 travels along path P. As the carriage 5 is aligned with path P the welding machine carried thereon maintains a consistent alignment with the workpiece 11 and joint 26 along the entire length of the workpiece 11. Thus, local or incidental dimension variation and differential expansion of the workpiece 11 caused by extreme localized heating will not affect alignment of the carriage 5. The joint to be welded is substantially parallel to the path P and the carriage 5 maintains consistent alignment with the joint 26.

Figure 8:
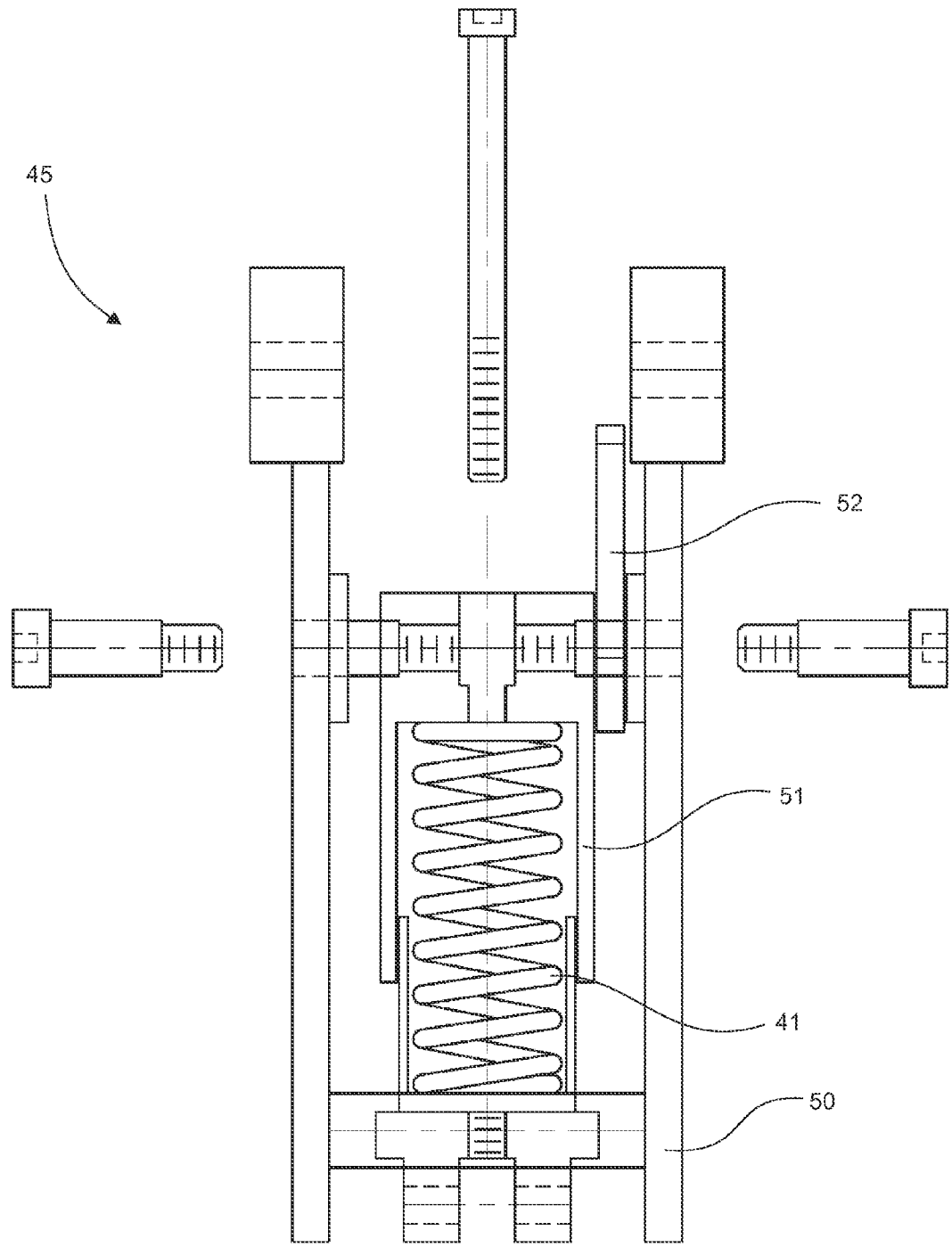
FIG. 8 is an exploded view of the tensioning device of the embodiment according to FIG. 7.

Referring back to FIG. 7 and shown in greater detail in FIG. 8, the tensioning device 45 comprises the spring 41 housed within a spring housing 50. A torque arm or lever 51 disposed on the spring housing 50 is used to actuate and lock the tensioning device 45 between a biased, engaged position and an unengaged position. A locking mechanism, such as a torque arm lock or tab 52 can be used to lock or secure the tensioned biased guide wheel 36b in its either the engaged or unengaged position.

Referring to FIGS. 2 and 3B, the connector 24, or adjusting means associated with the connector 24 are provided for adjusting the spacing between the lateral supports 14a, 14b. The adjusting means enable a first coarse adjustment for adapting to workpieces of different width W. The lateral supports 14a, 14b are fixed to that width of workpiece, ensuring the biased guide wheels 36b will forcibly engage and impose a force on side 11b, and a reactive force at the fixed guide wheels 36f on side 11a of the workpiece 11. The adjusting means can be manual, including disconnecting and reconnecting bars to space the lateral supports 14a, 14b or some automated arrangement including directly manipulating the spacing with one or more actuators, or, as illustrated in FIG. 3B, using a linkage 60 for minimizing actuators and hardware.

In an embodiment, and with reference to FIG. 3A, the linkage 60 comprises leading and trailing linkages 80, 81 that actuate in unison to adjust the lateral spacing between the first and second lateral supports 14a, 14b. The leading and trailing linkages 80, 81 also ensure that the first and second lateral supports 14a, 14b remain parallel to one another while adjusting the lateral spacing therebetween and further add structural rigidity to the carriage 5. The leading and trailing linkages 80, 81 each comprise the first and second four-bar parallelogram linkages 61a, 61b, 81a, 81b. With leading and trailing linkages 80, 81, there are pairs of common fulcrum points 62, 62 and pairs of common actuator points 69, 69. As best shown in FIG. 1, one centrally located actuator 70 can be used by providing a common actuator yoke 82 extending between the common actuator points 69, 69, and a common fulcrum yoke 83 extending between the common fulcrum points 62,62, one actuator 70 active between the fulcrum yoke 83 and the actuator yoke 83 simultaneously actuating both leading and trailing linkages 80, 81.

As shown in greater detail in FIG. 3B, each of the leading and trailing linkages 80, 81 can be in a form of two, four-bar parallelogram linkages having the first parallelogram linkage 61a pivotally connected to the second parallelogram linkage 61b at an intermediate and common fulcrum point 62. A four-bar parallelogram linkage having two pairs of parallel bars provides structural rigidity and ensures co-parallel actuation of the lateral supports 14a, 14b. Each of the first and second parallelogram linkages 61a, 61b has an upper bar 63 and a lower bar 64. Outer ends 65, 65 of the upper and lower bars 63, 64 are pivotally connected to the first or second lateral support 14a, 14b, while inner ends 66, 66 are pivotally connected to the common fulcrum point 62.

The first and second parallelogram linkages 61a, 61b are manipulated by first and second actuation linkages 67a, 67b. The first actuation linkage 67a connects to the first parallelogram linkage 61a at a first drive point 68a intermediate along its length and to an intermediate and common actuation point 69. The second actuation linkage 67b connects to the second parallelogram linkage 61b at a second drive point 68b intermediate along its length and to the common actuation point 69. An actuator 70 is connected to the fulcrum point 62 and the actuator point 69. As the actuator 70 drives the two points 62, 69, apart the actuation linkages 67a, 67b drive the first and second parallelogram linkages 61a, 61b apart for adjusting the lateral spacing between the first and second lateral supports 14a, 14b. In an embodiment, the actuator 70 is a linear actuator which drives a vertical adjustment post 71 and the actuator point 69 up or down, relative to the common fulcrum point 62 to expand or retract the lateral spacing between the first and second lateral supports 14a, 14b.

Figure 10:
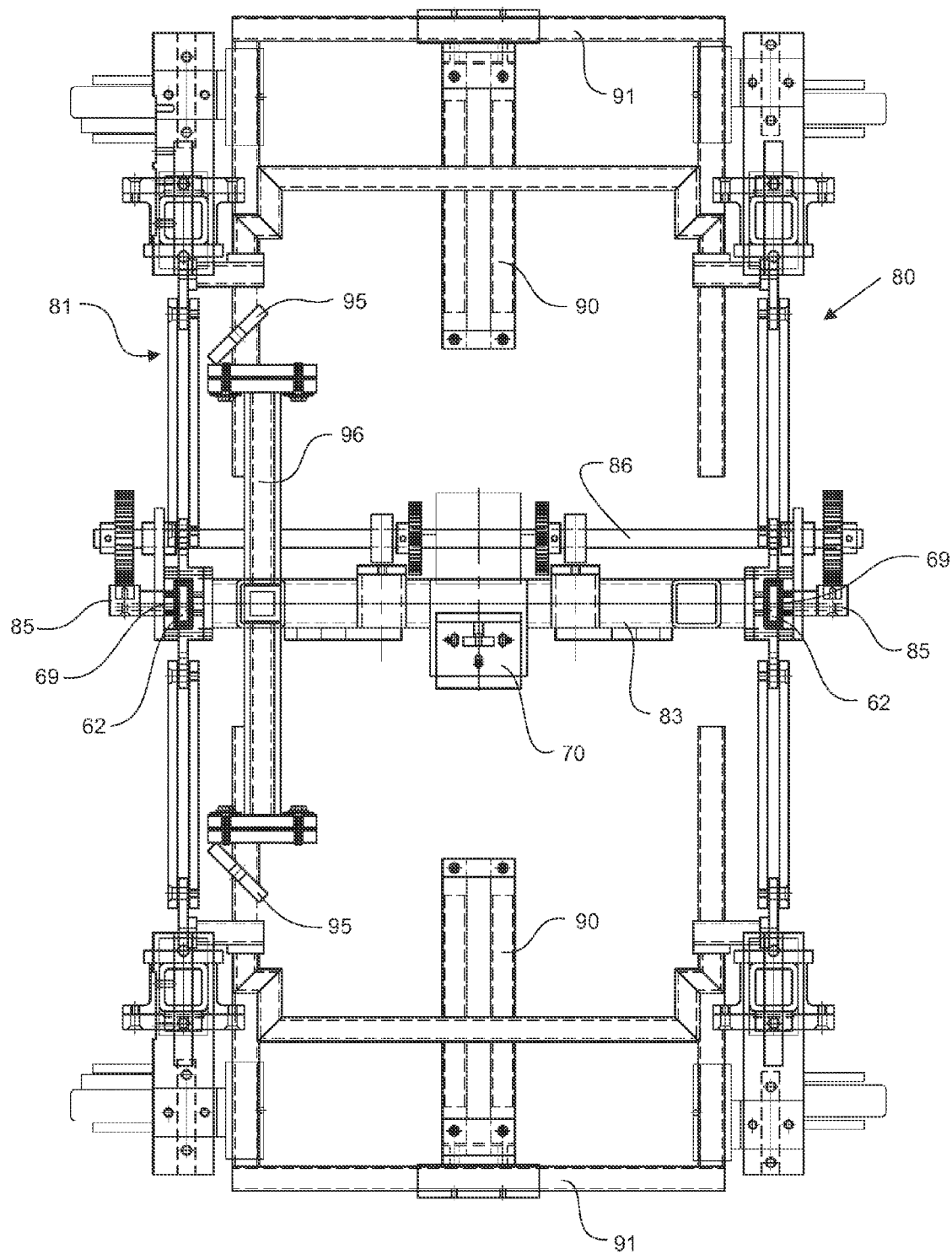
FIG. 10 is a plan view of an embodiment of a frame having a first and second lateral support interconnected by two, four-bar parallelogram linkages, the linkages having a rack and pinion type actuator disposed thereon, the frame further comprising a support bar for wire spools, and a manipulator for supporting welding machines.
Figure 11:
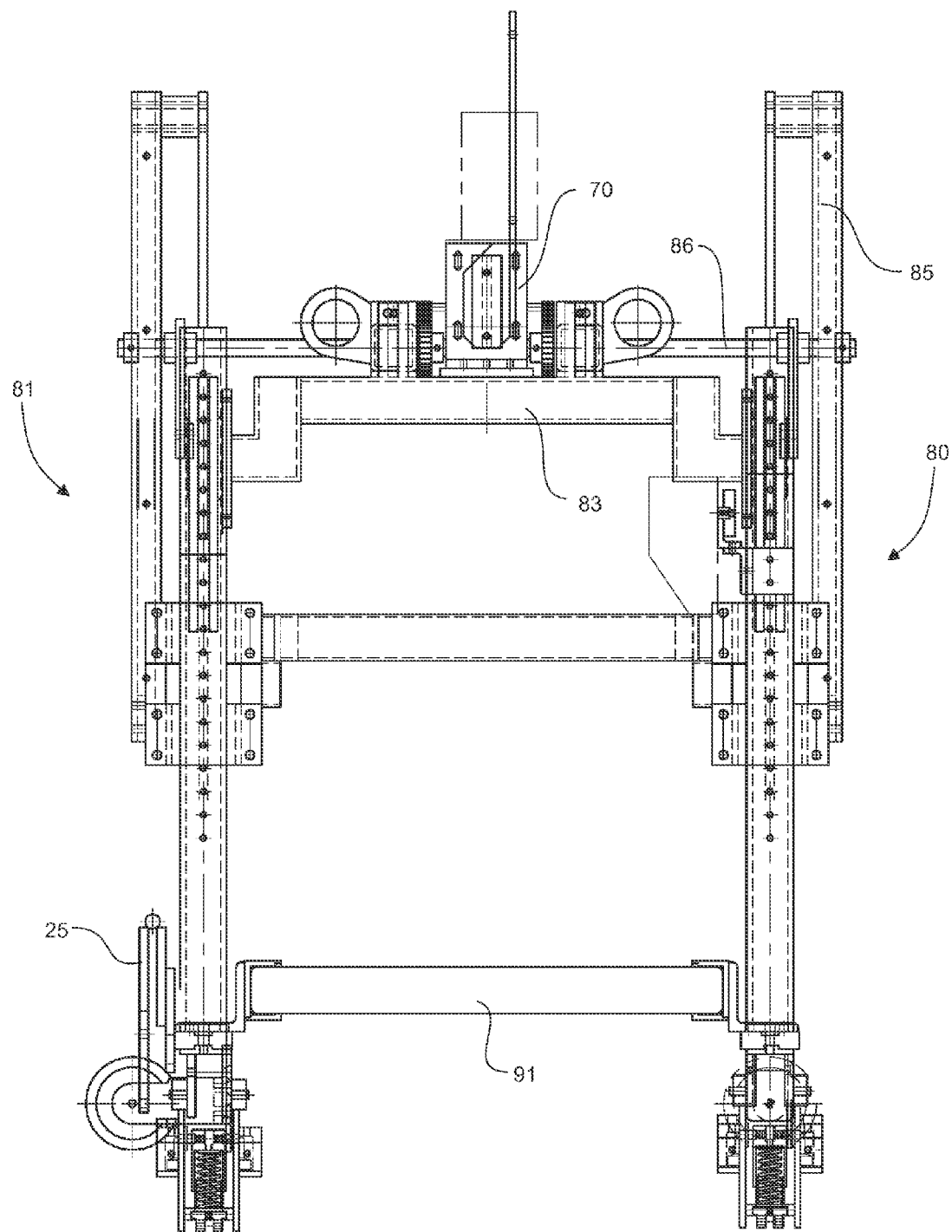
FIG. 11 is a right side view of the embodiment according to FIG. 10, illustrating the second lateral support having a pair of vertically adjustable leg posts, each leg post supporting a second wheel assembly and the actuator having a common fulcrum yoke extending between the leading and trailing linkages.
Figure 12:
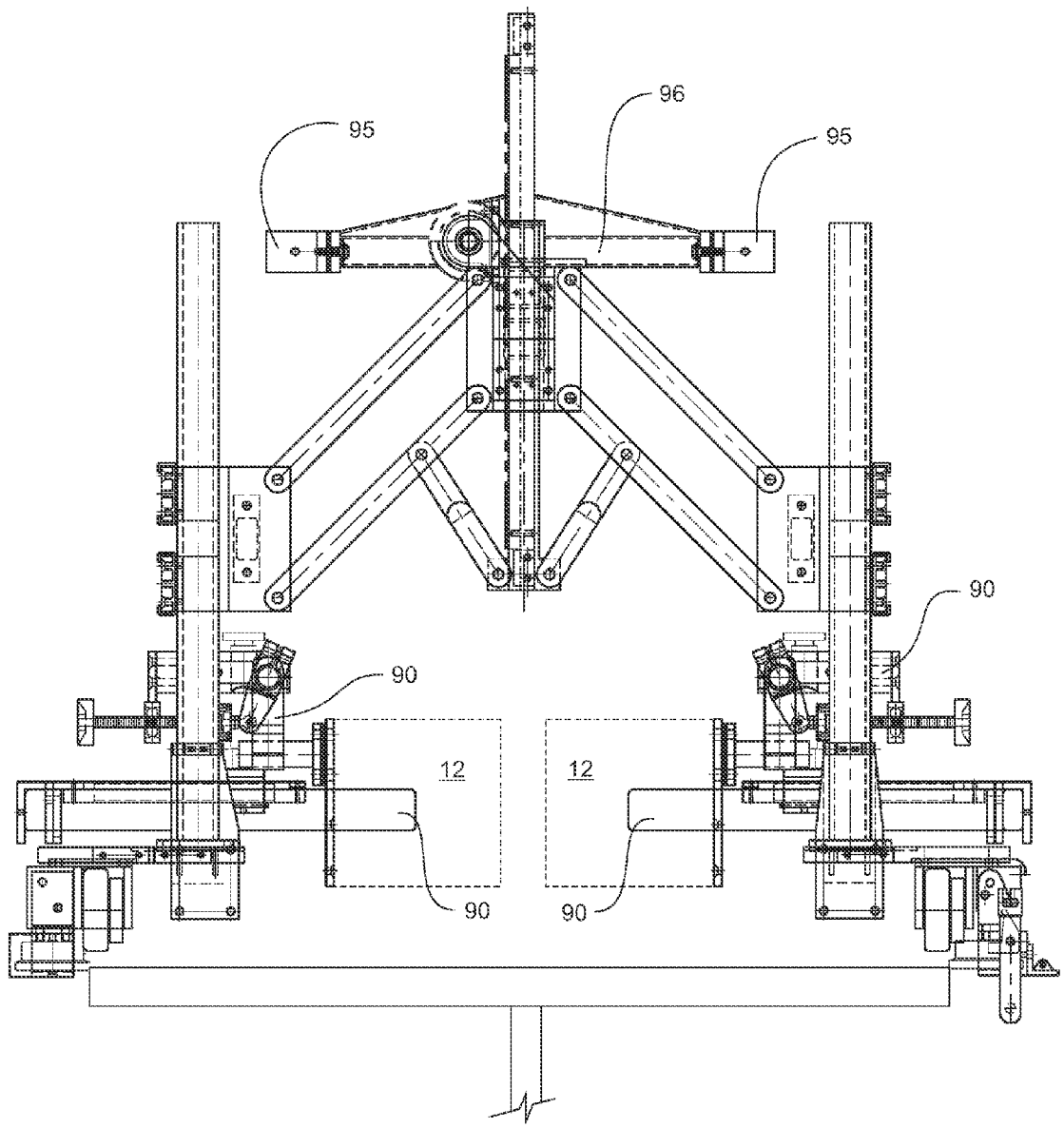
FIG. 12 is an end view of the embodiment according to FIG. 10, illustrating the wire spool supports, the tool supports, and one of the four-bar parallelogram linkages and the actuator linkages, the four-bar parallelogram linkage having a vertical adjustment rack.

In another embodiment as shown in FIGS. 10 11, and 12, the actuator 70 is a rack and pinion type of actuator. The leading and trailing linkages 80, 81 are joined at the common fulcrum 62 by the fulcrum yoke 83. There is no need for an actuator yoke thus freeing space within the frame 10. Each common actuator point 69 of the leading and trailing linkages 80, 81 is connected to a vertical adjustment rack 85. A driven shaft 86 along the fulcrum yoke 83 drives a pinion 87 which engages for each rack 85. Rotation of the driven shaft 86 and pinions 87 in one direction drives the racks 85, 85 upwardly, widening the frame 10, and rotation of the driven shaft 86 in the opposite direction drives the racks 85, 85 downwardly, narrowing the frame 10. The adjustment in width of the frame 10 allows the carriage 5 to universally straddle and laterally grip workpieces of various widths W.

The carriage 5 can further comprise at least one tool support 90, such as a welding machine manipulator, for each supporting a welding machine 12 (FIG. 1, 3B) thereon. The manipulator 90 can be capable of independently adjusting the vertical and horizontal position of the welding machine 12, as well as the angle at which the machine 12 approaches a weld joint 26.

Figure 4:
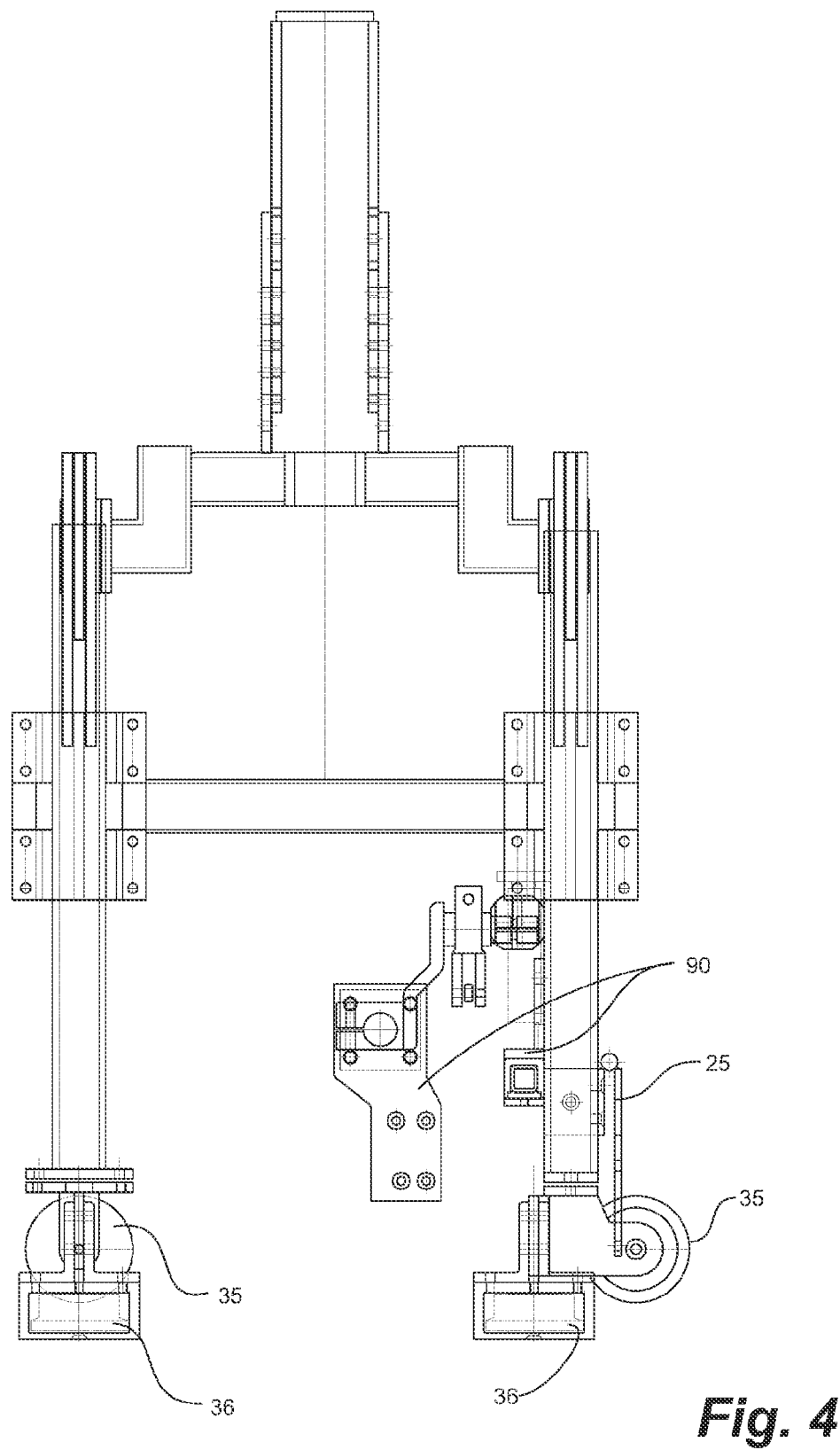
FIG. 4 is a left side view of the embodiment according to FIG. 3A, illustrating the first lateral support having a first pair of vertically adjustable leg posts, each leg post supporting the first wheel assembly (actuator omitted)
Figure 6:
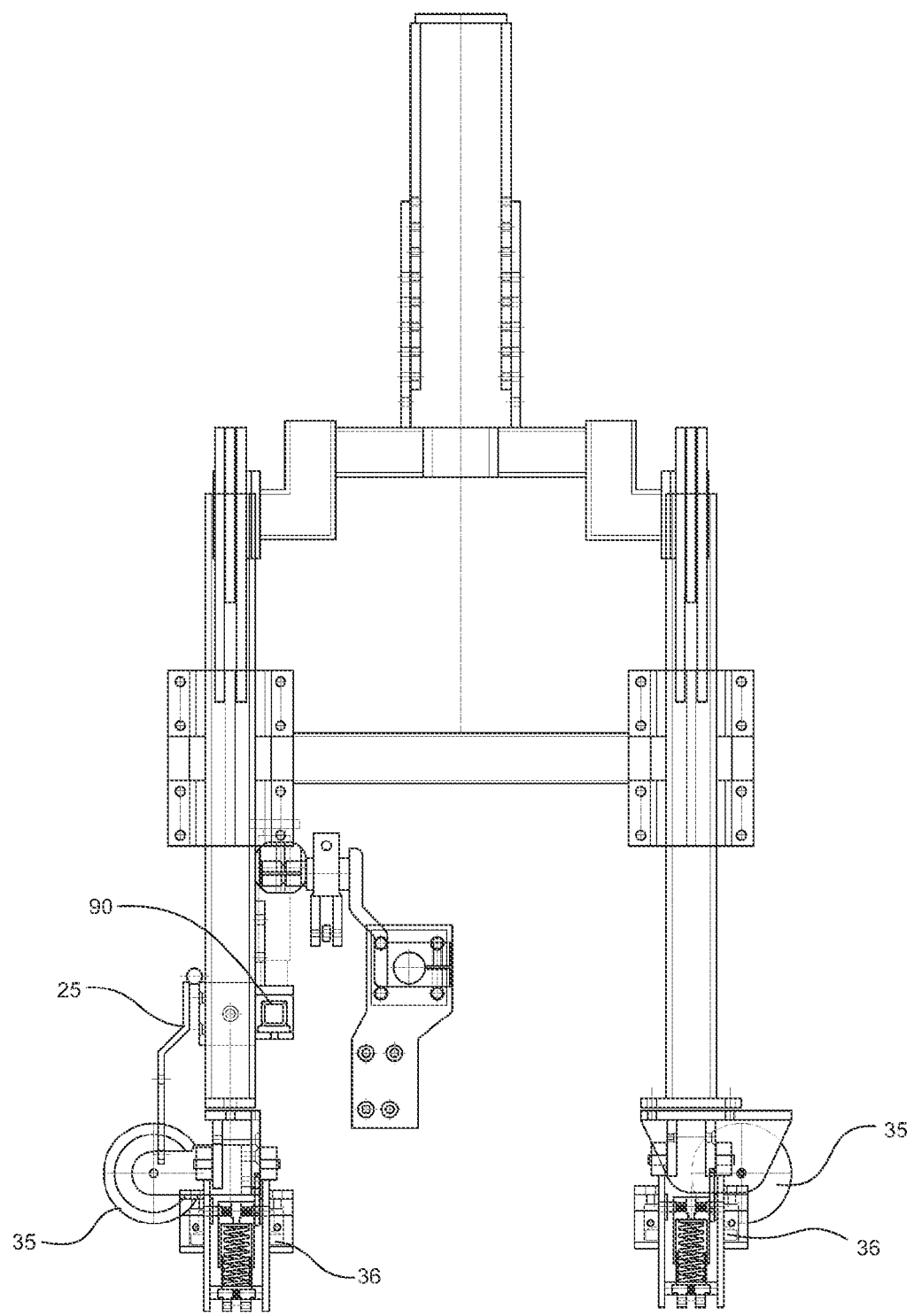
FIG. 6 is a right side view of the embodiment according to FIG. 3A, illustrating the second lateral support having a second pair of vertically adjustable leg posts, each leg post supporting the biased guide wheels of the second wheel assembly.

In one embodiment and with reference to FIGS. 3B, 4, and 6, the manipulator 90 can be supported on any one of leg posts 30a, 30a, 30b, 30b. In alternate embodiments, as many as four manipulators, one manipulator for each leg post, can be supported by the welding carriage 5 of this present invention. In such an embodiment, up to four weld joints can be welded simultaneously.

In a preferred embodiment and with reference to FIGS. 10 to 12, the manipulator 90 can be can be supported on an lateral extension 91 extending between either the first pair of leg posts 30a, 30a or extending between the second pair of leg posts 30b, 30b. As best shown in FIGS. 10 and 11, the lateral extension 91 extends between the leg posts of either the first or second lateral support 14a, 14b. In an embodiment and as shown, the carriage 5 can comprise two opposing lateral extensions 91, 91 each for supporting a single manipulator 90. In an embodiment, the two opposing lateral extensions 91, 91 can support one or more manipulators 90.

The lateral extensions 91 can further increase the overall rigidity and strength of the carriage 5.

A wire spool or reel of continuous feeding electrode, for each of the at least one welding machine 12, can be supported directly on each of the at least one welding machines 12. In an embodiment and with reference to FIGS. 10 and 12, the carriage 5 can have a dedicated wire spool support 95 for supporting each wire spool for each of the at least one welding machines 12. As shown, the wire spool support 95 is supported at an end of a support bar 96 supported by and laterally extending from the fulcrum yoke 83. The wire spool support 95 can be positioned adjacent the trailing linkage 81 of the carriage 5 to be in close proximity to the at least one welding machine 12 supported on manipulator 90.

In one embodiment, the support bar 96 can extend laterally in opposing directions from the fulcrum yoke 83 to have two opposing ends, each end supporting a wire spool support 95.

EXAMPLE

I-beams are typically manufactured by welding three pieces together; first and second opposing flanges, interconnected by a connecting member or web, with each of the first and second flanges further comprising opposing and substantially parallel lateral sides. During fabrication, the three pieces are initially tack welded together to form the I-beam having a first flange (A), a second flange (B) and a web (C). The I-beam is then supported above the fabrication floor and the weld joints along the first flange (A), the interconnecting web (C) and the second flange (B) are welded together.

Prior art methods required the transportation of the three pieces to where prior art welding carriages were located, as these carriages were not portable and relied on permanent guide tracks. In contra-distinction, manufacturing of I-beams using the welding carriage of the present invention does not require the transportation of the three pieces to a specific location for fabrication.

The welding carriage of the present invention permits fabrication of I-beam at any location so long as there is sufficient space to accommodate the three pieces. The welding carriage is movably supported on either the first or second flange (A) or (B) of the tack welded I-beam and then propelled along the entire length of the I-beam along a weld path. The carriage guides and aligns itself relative to the I-beam by engaging the opposing and substantially parallel lateral sides of the I-beam, the sides being substantially parallel to the weld joint to be welded.

With the welding carriage transported to the fabrication site, at least one welding machine and associated wire spools can be supported thereon and prepared for used.

Figure 13A:
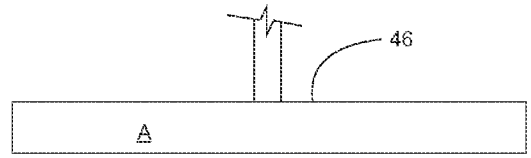
FIGS. 13A to 13H are schematic representations of an embodiment of the invention, illustrating the progressive steps for securing a welding carriage to a bottom flange of an I-beam being fabricated.

With reference to FIGS. 13A and in greater detail, at the fabrication site, the tack welded I-beam is placed on the fabrication floor. To provide sufficient ground clearance for the guide wheels 36, the I-beam can be suspended above the fabrication floor. As the carriage of the present invention does not rely on a permanently placed track or rail for guidance or alignment relative to a weld joint, the fabricators need not worry about the direction of the I-beam. The welding carriage 5 is positioned to straddle the I-beam and be secured to the first flange (A) of the I-beam. Alternatively, the carriage 5 can be secured to the second flange (B) of the I-beam, and the welding machine positioned relative to the weld joint by the manipulator.

A person of ordinary skill in the art would understand that if the carriage is secured to a bottom flange of the tacked I-beam, the lateral spacing between opposing leg posts 30a, 30b would require sufficient clearance to pass by the upper of the I-beam. Accordingly, and as more clearly shown in FIGS. 5B and 9C, in an embodiment, first and second wheel assemblies 20a, 20b can be positioned to be laterally offset relative to their respective leg posts 30a, 30b for providing sufficient clearance from the upper flange of the tacked I-beam.

Figure 13B:
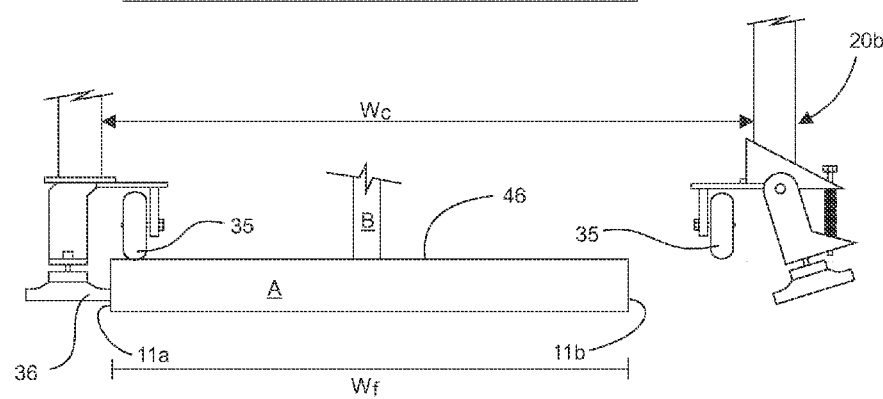
Figure 13C:
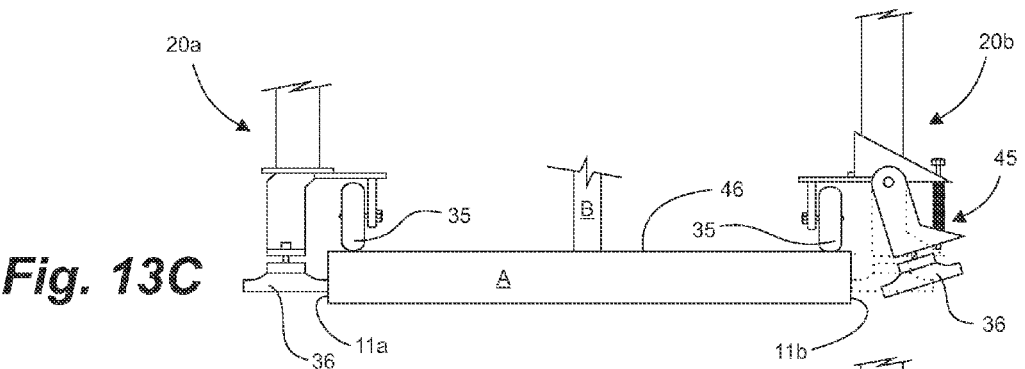

As shown in FIGS. 13B and 13C, the carriage 5 can be initially adjusted to have a working width ($W_C$) greater than a width ($W_F$) of the first flange (A) and then adjusted to have a working width substantially the same as the width of the first flange (A).

The first wheel assemblies 20a are positioned adjacent a first opposing lateral side 11a of the first flange (A) to movably engage the first opposing and substantially parallel lateral side 11a. The support wheels 35 of the first wheel assembly 20a are supported upon the top surface 46 of the first flange (A) while guide wheels 36 engage the first opposing lateral side 11a.

The second wheel assemblies 20b, having their guide wheels 36 in their unengaged position, can then be positioned adjacent to a second opposing lateral side 11b of the first flange (A) by adjusting the working width ($W_C$) of the carriage 5.

Figure 14A:
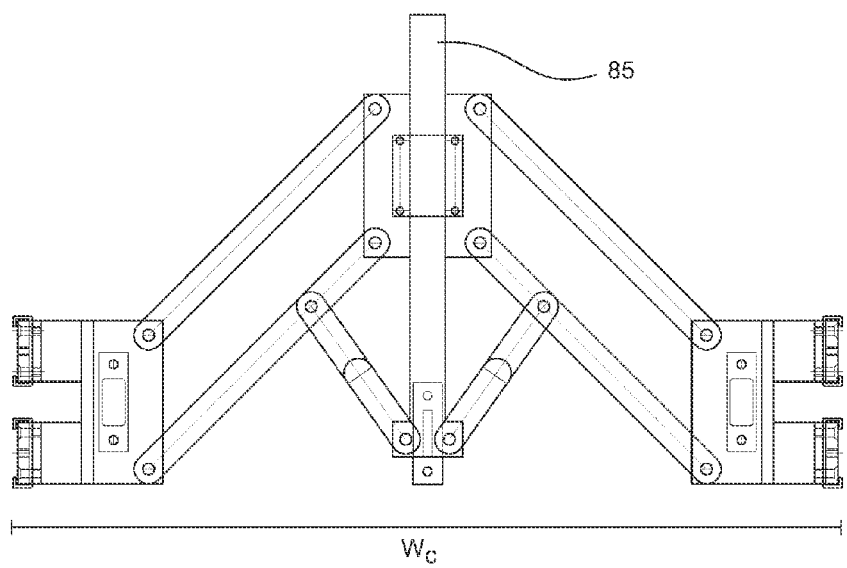
FIGS. 14A and 14B are schematic representations of an embodiment of the invention, illustrating the adjustment of a working width of the welding carriage from an intermediate width (FIG. 14A) to a maximum width (FIG. 14B).
Figure 14B:
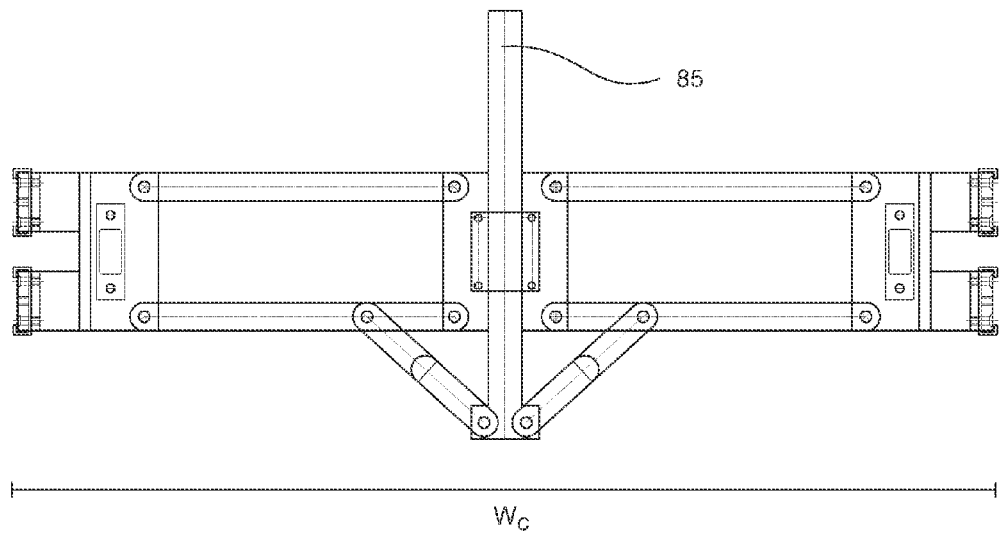

As shown in FIGS. 14A and 14B, the working width ($W_C$) can be adjusted by actuating the vertical adjustment racks 85 up or down with an actuator 70. Downward movement of the vertical adjustment racks increases the working width ($W_C$), and upward movement decreases the working width ($W_C$).

Figure 13D:
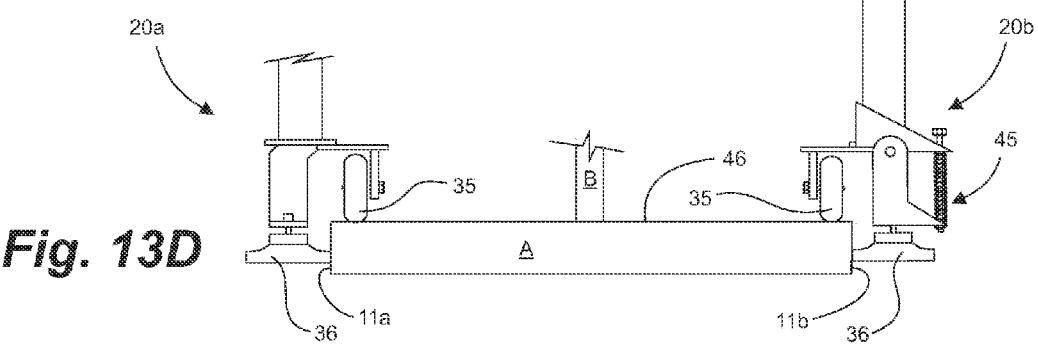

Returning to FIG. 13D, after the carriage 5 has been positioned to straddle the I-beam, the carriage 5 can be secured to the first flange (A) by locking the guide wheels 36 of the second wheel assemblies 20b. A tensioning device 45 can be used to actuate the guide wheels 36 from its unengaged position into its engaged position for pressingly engaging the second opposing and substantially parallel lateral side 11b of the first flange (A). Pressingly engaging the guide wheels 36 of the second wheel assemblies 20b against the second opposing lateral side 11b reactively results in the guide wheels 36 of the first wheel assemblies 20a to press against the first opposing lateral side 11a and secures the carriage 5 to the I-beam. The second wheel assembly 20b imposes a force into the second opposing lateral side 11b and permits adjustment for dimensional variations in the width of the first flange (A). the first and second wheel assemblies 20a, 20b forcibly engages the respective first and second opposing and substantially parallel lateral sides 11a, 11b for guiding the carriage relative to the joint to be welded.

Welding machine manipulators (not shown) can then be used to position and align welding machines relative to a first weld joint between the first flange (A) and the connecting member (C) along the entire length of the I-beam. The carriage 5 can be propelled along the entire length of the I-beam for welding the first weld joint.

As previously mentioned, localized heat from the welding machine can cause distortion or warping of the metal of the first flange (A) and the connecting member (C). Such warping can cause welding carriages of the prior art to make welds that are out of alignment with the weld joint, as the welding carriages of the prior art are aligned relative to a permanent guide track or rail. As the carriage 5 of the present invention aligns itself using the first or second opposing lateral sides 11a, 11b of the I-beam themselves subject to the distortions, the carriage 5 will maintain alignment relative to the weld joint, regardless of any warping of distortion of the first flange (A) caused by localized heating.

Figure 13E:
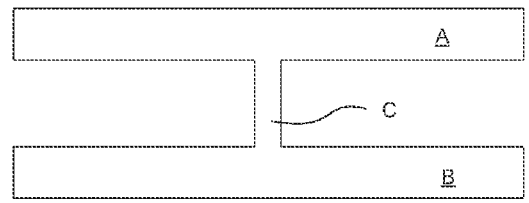

With reference to FIG. 13E, after the first flange (A) is welded to the connecting member (C), the partially completed I-beam is rotated 180 degrees such that the first flange (A) is now on the top and the second flange (B) is now on the bottom. The welding carriage is then secured to the second flange (B), straddling the first flange (A) and the interconnecting member (C).

Figure 13F:
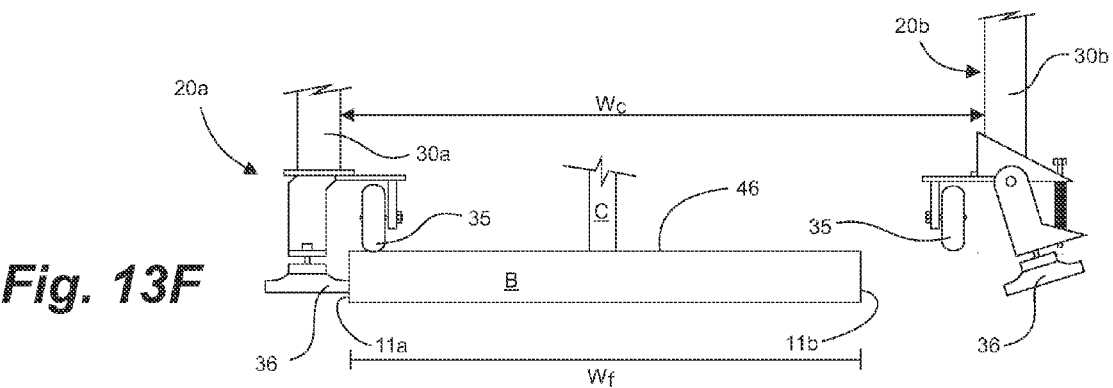
Figure 13G:
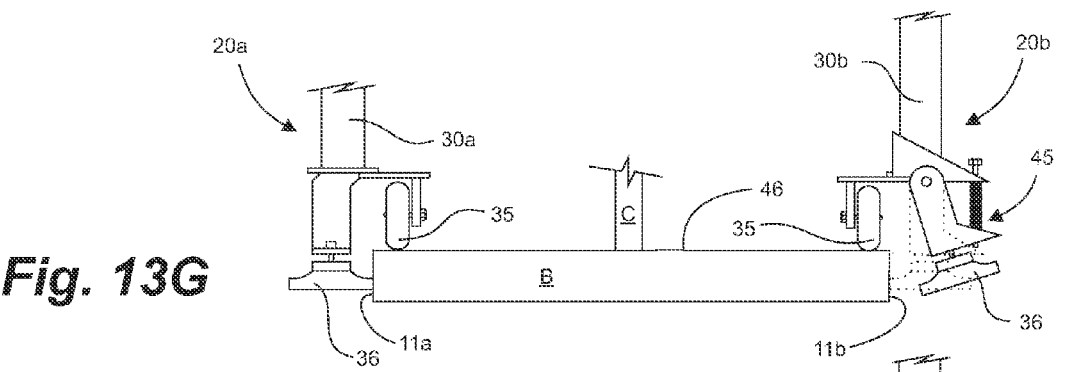

As shown in FIGS. 13F and 13G, the first wheel assembly is movable secured to the first opposing lateral side 11a of the second flange (B). The working width of the carriage can be adjusted to be substantially the same and the width of the now second flange (B) and the second wheel assembly can be secured to movably engage the second opposing lateral side 11b of the second flange (B).

Figure 13H:
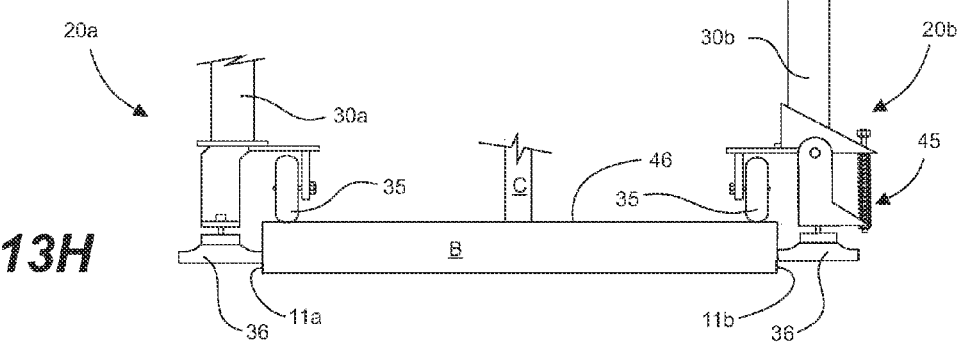

With reference to FIG. 13H, the guide wheels 36 of the second wheel assemblies 20b can be locked into their engaged position to secure the carriage 5 to the second flange (B). Once the carriage 5 is secured to the second flange (B), the carriage 5 can be propelled as the at least one welding machine supported thereon welds a weld joint between the connecting member (C) and the second flange (B).

In an embodiment, the carriage 5 can have multiple welding machines, each supported by a manipulator permitting the welding carriage to weld two or more weld joints, one on each side of the interconnecting member (C) along the first or second flanges (A), (B).

The embodiments of the invention for which an exclusive property or privilege is claimed are defined as follows:

1. A welding carriage for supporting at least one welding machine relative to a workpiece having substantially linear first and second lateral sides and a joint to be welded, the welding carriage comprising:
   a first lateral support having at least one first wheel assembly;
   a second lateral support having at least one second wheel assembly;

a four-bar leading parallelogram linkage and a four-bar trailing parallelogram linkage, each of the leading and trailing parallelogram linkages comprising first and second parallelogram linkages, each having an upper bar and a lower bar parallel to each other, each parallelogram linkage pivotally connected to each other at inner ends at a common fulcrum point and pivitally connected at outer ends to their respective first and second lateral supports, first and second actuation linkages, the first actuation linkage pivotally connecting to the first parallelogram linkage at a first drive point intermediate along its length and to an intermediate and common actuation point, and the second actuation linkage pivotally connecting to the second parallelogram linkage at a second drive point intermediate along its length and to the common actuation point, an actuator connected between the common fulcrum point and the common actuation point for driving the first and second parallelogram linkages together and apart for adjusting a lateral spacing between the first and second lateral supports, wherein the leading parallelogram linkage and the trailing parallelogram linkage form a frame for supporting the at least one welding machine; and the at least one first and the at least second wheel assemblies support the frame for movement upon the workpiece and guide the frame relative to the first and second lateral sides and along a path substantially parallel to the first and second lateral sides.

2. The welding carriage of claim 1, wherein the at least one first and the at least one second wheel assemblies forcibly engage the respective first and second lateral sides for guiding the frame relative to the path.

3. The welding carriage of claim 2, wherein one of the at least one first or the at least one second wheel assemblies is biased to forcibly engage its respective first or second lateral side.

4. The welding carriage of claim 2, wherein
the at least one first wheel assembly is fixed relative to the path and engages the first lateral side; and
the at least one second wheel assembly is biased for forcibly engaging the second lateral side and maintaining the frame along the path despite dimensional variation between the first and second lateral sides.

5. The welding carriage of claim 2, wherein
the at least one first wheel assembly is fixed relative to the path and engages the first lateral side; and
the at least one second wheel assembly is biased for forcibly engaging the second lateral side and adjusting for dimensional variation between the first and second lateral sides.

6. The welding carriage of claim 2, wherein
the at least one first wheel assembly comprises support wheels for supporting the first lateral support upon the workpiece, and fixed guide wheels for engaging the first lateral side and guiding the frame relative to the path; and
the at least one second wheel assembly comprises support wheels for supporting the second lateral support upon the workpiece and biased guide wheels for forcibly engaging the second lateral side.

7. The welding carriage of claim 6 wherein the at least one second wheel assembly further comprises:
a wheel housing secured to the second lateral support, the biased guide wheel being pivoted from the housing; and
a spring acting between the housing and the guide wheel to bias the guide wheel towards the workpiece.

8. The welding carriage of claim 7, wherein the second wheel assembly further comprises a locking mechanism for securing the guide wheel housing in either an engaged position, for forcibly engaging the second lateral side, or an unengaged position.

9. The welding carriage of claim 1, wherein the frame further comprises:
a central fulcrum yoke between the common fulcrum points wherein the actuator acts upon the fulcrum yoke to adjust the lateral spacing.

10. The welding carriage of claim 9, wherein the frame further comprises:
a central actuation yoke between the common actuation points wherein the actuator acts between the fulcrum yoke and the actuation yoke to adjust the lateral spacing.

11. The welding carriage of claim 1, wherein the first lateral support comprises a first pair of legs and the second lateral support comprises a second pair of legs, each leg comprising an independently vertically adjustable leg post for adjusting a working height of the carriage.

12. The welding carriage of claim 11, wherein the frame further comprises:
a first stabilizer between each leg of the first pair of legs; and
a second stabilizer between each leg of the second pair of legs.

13. The welding carriage of claim 1, wherein the workpiece is an I-beam having at least one flange and a web, and a weld joint being between the at least one flange and the web, and wherein the first wheel assembly engages the first lateral side of the flange and the second wheel assembly engages the second lateral side of the flange for guiding the frame relative to the first and second lateral sides and along a path substantially parallel to the weld joint.

14. A method of welding at least one joint along a workpiece having first and second opposing and substantially parallel lateral sides comprising:
movably supporting a welding machine on a frame upon the workpiece, the frame comprising first and second lateral supports, at least a first and a second wheel assembly, a four-bar leading parallelogram linkage and a four-bar trailing parallelogram linkage, each of the leading and trailing parallelogram linkages connected between the first and second lateral supports, each of the leading and trailing parallelogram linkages comprising, first and second parallelogram linkages, each having an upper bar and a lower bar parallel to each other, each parallelogram linkage pivotally connected to each other at inner ends at a common fulcrum point and pivotally connected at outer ends to their respective first and second lateral supports, first and second actuation linkages, the first actuation linkage pivotally connecting to the first parallelogram linkage at a first drive point intermediate along its length and to an intermediate and common actuation point, and the second actuation linkage pivotally connecting to the second parallelogram linkage at a second drive point intermediate along its length and to the common actuation point;

engaging the at least first wheel assembly to the first lateral side and engaging at least second wheel assembly to the second lateral side;

adjusting a lateral spacing between the first and second lateral supports by actuating the leading and trailing parallelogram linkages for adjusting a width of the frame to a width of the workpiece between the first and second opposing and substantially parallel lateral sides;

propelling the welding machine;

guiding the welding machine along the at least one joint along the workpiece; and welding the at least one joint.

15. The method of claim 14, wherein the engaging of the at least second wheel assembly to the workpiece comprises biasing the at least second wheel assembly for imposing a force into the second opposing side and adjusting for dimensional variations.

16. The method of claim 14, further comprising adjusting a working height of the frame.

17. The method of claim 14, wherein the workpiece is an I-beam having at least one flange and a web, and a weld joint between the at least one flange and the web, the method comprising:

movably supporting and propelling the welding machine upon the flange;

guiding the welding machine along the at least one joint along the workpiece by engaging opposing and substantially parallel sides of the flange.

18. The welding carriage of claim 10, wherein the first lateral support comprises a first pair of legs and the second lateral support comprises a second pair of legs, each leg comprising an independently vertically adjustable leg post for adjusting a working height of the carriage.

19. The welding carriage of claim 10, wherein the workpiece is an I-beam having at least one flange and a web, and a weld joint being between the at least one flange and the web, and wherein the first wheel assembly engages the first lateral side of the flange and the second wheel assembly engages the second lateral side of the flange for guiding the frame relative to the first and second lateral sides and along a path substantially parallel to the weld joint.

20. The welding carriage of claim 11, wherein the workpiece is an I-beam having at least one flange and a web, and a weld joint being between the at least one flange and the web, and wherein the first wheel assembly engages the first lateral side of the flange and the second wheel assembly engages the second lateral side of the flange for guiding the frame relative to the first and second lateral sides and along a path substantially parallel to the weld joint.

21. The method of claim 14, wherein at least one of the first or second wheel assembly is a biased wheel assembly, the method further comprising:

locking the biased wheel assembly in an engaged position for forcibly engaging the workpiece.

22. The method of claim 16, wherein the workpiece is an I-beam having at least one flange and a web, and a weld joint between the at least one flange and the web, the method comprising:

movably supporting and propelling the welding machine upon the flange;

guiding the welding machine along a path along the workpiece by engaging opposing and substantially parallel sides of the flange.

* * * * *